(12) United States Patent
Vanden Hoek et al.

(10) Patent No.: US 12,327,681 B2
(45) Date of Patent: Jun. 10, 2025

(54) MAGNETIC ALIGNMENT ASSEMBLY FOR INDUCTIVE CHARGING SYSTEMS

(71) Applicant: Apple Inc., Cupertino, CA (US)

(72) Inventors: Brennan K. Vanden Hoek, Bear Valley, CA (US); Makiko Kawamura Brzezinski, Santa Clara, CA (US); Miranda L. Daly, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 494 days.

(21) Appl. No.: 17/655,533

(22) Filed: Mar. 18, 2022

(65) Prior Publication Data

US 2023/0079950 A1    Mar. 16, 2023

Related U.S. Application Data (60) Provisional application No. 63/261,125, filed on Sep. 13, 2021.

(51) Int. Cl.
| | | |
|---|---|---|
| *H01F 7/02* | (2006.01) | |
| *H02J 50/10* | (2016.01) | |
| *H02J 50/90* | (2016.01) | |

(52) U.S. Cl.
CPC ............ *H01F 7/0252* (2013.01); *H02J 50/10* (2016.02); *H02J 50/90* (2016.02)

(58) Field of Classification Search
CPC .......... H02J 50/90; H02J 50/10; H02J 7/0044; H01F 7/0252; H01F 38/14; H01F 7/0247
See application file for complete search history.

(56) References Cited

U.S. PATENT DOCUMENTS

| | | | |
|---|---|---|---|
| 8,688,037 B2 | 4/2014 | Chatterjee et al. | |
| 10,381,881 B2 | 8/2019 | Wittenberg et al. | |
| 10,404,089 B2 | 9/2019 | Kasar et al. | |
| 10,491,041 B2 | 11/2019 | Wittenberg et al. | |
| 2012/0146576 A1 | 6/2012 | Partovi | |
| 2012/0146752 A1* | 6/2012 | Fullerton | H05K 9/00 335/306 |
| 2013/0260677 A1 | 10/2013 | Partovi | |
| 2014/0015493 A1 | 1/2014 | Wirz et al. | |
| 2022/0166868 A1* | 5/2022 | Whitten | F16M 13/00 |

FOREIGN PATENT DOCUMENTS

| | | | |
|---|---|---|---|
| CN | 205670700 U | 11/2016 | |
| CN | 208581077 U | 3/2019 | |
| JP | 2013120837 A | 6/2013 | |
| JP | 2015171166 A | 9/2015 | |
| TW | 201347349 A | 11/2013 | |
| TW | 201711335 A | 3/2017 | |
| WO | WO-2008093334 A2 * | 8/2008 | G01V 3/08 |
| WO | 2010/129369 A2 | 11/2010 | |

* cited by examiner

*Primary Examiner* — Mohamad A Musleh
(74) *Attorney, Agent, or Firm* — Kilpatrick Townsend & Stockton LLP (57) ABSTRACT

A magnetic alignment assembly can be incorporated into an electronic device to facilitate alignment with another device. The magnetic alignment assembly can include a main magnet (e.g., a square or rectangular magnet) having a magnetic dipole in an axial direction and a ring magnet coaxial with the main magnet. The ring magnet can be smaller than the main magnet. The ring magnet can be positioned between the main magnet and an interface surface.

7 Claims, 8 Drawing Sheets

MAGNETIC ALIGNMENT ASSEMBLY FOR INDUCTIVE CHARGING SYSTEMS

CROSS-REFERENCES TO RELATED APPLICATIONS

This application claims priority to U.S. Provisional Application No. 63/261,125, filed on Sep. 13, 2021, the disclosure of which is incorporated by reference herein.

BACKGROUND

The present disclosure relates generally to alignment of electronic devices and in particular to a magnetic alignment assembly for inductive charging systems.

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector includes a cavity in the portable electronic device that provides an avenue via which dust and moisture can intrude and damage the device. Further, a user of the portable electronic device has to physically connect the charging cable to the receptacle connector in order to charge the battery.

To avoid such shortcomings, wireless charging technologies have been developed that exploit electromagnetic induction to charge portable electronic devices without the need for a charging cord. For example, some portable electronic devices can be recharged by merely resting the device on a charging surface of a wireless charger device. An inductive transmitter coil disposed below the charging surface is driven with an alternating current that produces a time-varying magnetic flux that induces a current in a corresponding inductive receiver coil in the portable electronic device. The induced current can be used by the portable electronic device to charge its internal battery. Some portable electronic devices have been designed to not only receive power wirelessly but also to transmit power wirelessly to other portable electronic devices, such as accessory devices.

Among other factors, the efficiency of wireless power transfer depends on the alignment between the transmitter and receiver coils. For instance, a transmitter coil and receiver coil may perform best when they are aligned coaxially. Where a portable electronic device has a flat or smooth curved surface with no guiding features, finding the proper alignment can be difficult. Often, alignment is achieved by trial and error, with the user shifting the relative positions of the device and charger and observing the effect on charging performance. Establishing optimal alignment in this manner can be time-consuming. Further, the absence of surface features can make it difficult to maintain optimal alignment. For example, if the portable electronic device and/or charger are jostled during charging, they may be shifted out of alignment. For these and other reasons, improved techniques for establishing and maintaining alignment between electronic devices would be desirable.

SUMMARY

Certain embodiments of the present invention relate to magnetic alignment assemblies that can be incorporated into an electronic device to facilitate alignment with another device. For example, the magnetic alignment assembly can be incorporated into a wearable device that has a an inductive receiver coil to facilitate alignment with a charger device that has an inductive transmitter coil. In some embodiments, a magnetic alignment assembly can include a main magnet (e.g., a square, rectangular, or cylindrical magnet having a particular width and thickness) with magnetic dipoles oriented along the axial direction and a ring magnet (e.g., an annular magnet having an inner diameter, an outer diameter, and thickness) coaxial with the main magnet. The ring magnet can be smaller (e.g., thinner) than the main magnet, and the outer diameter of the ring magnet can be smaller than the width of the main magnet. The ring magnet can be positioned between the main magnet and a charging surface (or other interface surface). In some embodiments, the ring magnet and the main magnet can be spaced apart from each other in the axial direction, and a component of an electronic device, such as a sensor package, can be positioned in the space between the ring magnet and the main magnet.

The following detailed description, together with the accompanying drawings, will provide a better understanding of the nature and advantages of the claimed invention.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Figure 1:
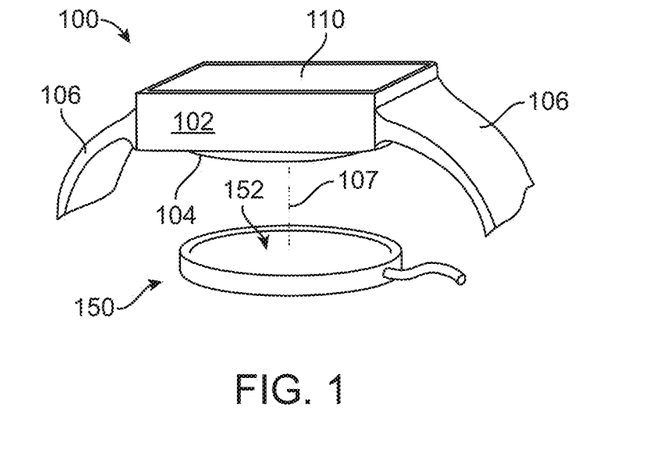
FIG. 1 shows a perspective view of an electronic device and a wireless charger device according to some embodiments.

FIG. 1 shows a perspective view of an electronic device 100 and a wireless charger device 150 according to some embodiments. Electronic device 100 can include a housing 102 having a magnetically transparent window 104 formed on one surface (e.g., a rear surface). Window 104 can be made of materials such as crystal, glass or polymers, or any other material that permits the transmission of magnetic fields having a frequency in a range used for wireless power transfer (e.g., from about 300 kHz to about 2 MHz), while the rest of housing 102 can be made of other materials such as aluminum or steel that may or may not impede transmission of time-varying magnetic fields. Electronic device 100 can also include an electronic display 110 positioned on an opposite side of housing 102 from window 104. In some embodiments, electronic display 110 can take the form of a touch screen configured to display a graphical user interface to a user of electronic device 100. In this example, electronic device 100 can include a wristband 106 for securing electronic device 100 to a wrist of a user. While electronic device 100 is depicted as a wrist-wearable device it should be understood that magnetic alignment assemblies of the kind described herein can be incorporated into any type of rechargeable electronic device.

A wireless charger device 150 can be used to provide power to electronic device 100 using inductive power transfer. For example, wireless charger device 150 can include a transmitter coil (not shown in FIG. 1) and driver circuitry to generate an alternating current in the transmitter coil. Time-varying magnetic fields produced by the alternating current can exit wireless charger device 150 through a charging surface 152. Electronic device 100 can have a receiver coil (not shown in FIG. 1) disposed adjacent to window 104. In operation, wireless charger device 150 can drive the transmitter coil, thereby generating a time-varying magnetic field, e.g., an oscillating field having a particular frequency. The time-varying magnetic field can induce an electrical current in a receiver coil (not shown in FIG. 1) in electronic device 100, and the electrical current can be used to charge an internal battery of electronic device 100 and/or to supply power to other circuitry within electronic device 100.

Efficiency of wireless power transfer depends on a number of factors, including alignment between the transmitter and receiver coils. In some embodiments, wireless charger device 150 and electronic device 100 can include magnetic alignment components (not shown in FIG. 1) to attract and hold the transmitter and receiver coils in a desired alignment. For instance, the desired alignment may align the transmitter and receiver coils along a longitudinal axis 107.

Figure 2A:
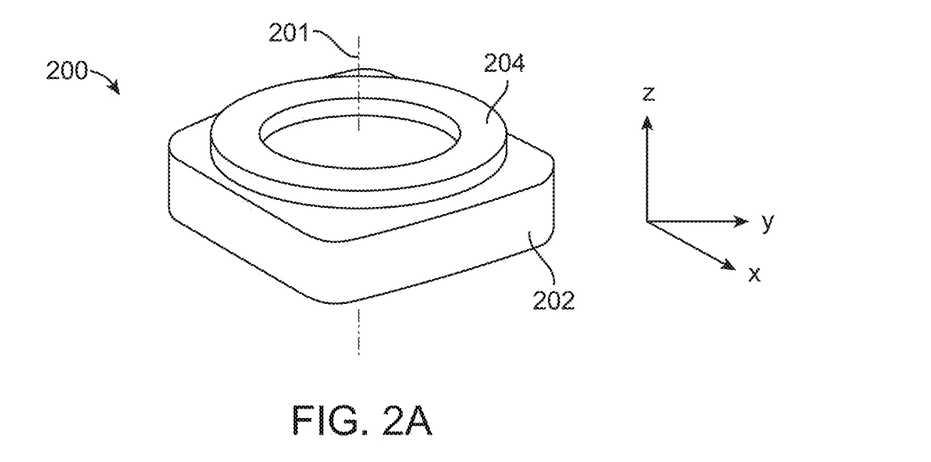
FIGS. 2A-2C show, respectively, a perspective view, a top view, and a side cross-section view of a magnetic alignment assembly according to some embodiments.
Figure 2B:
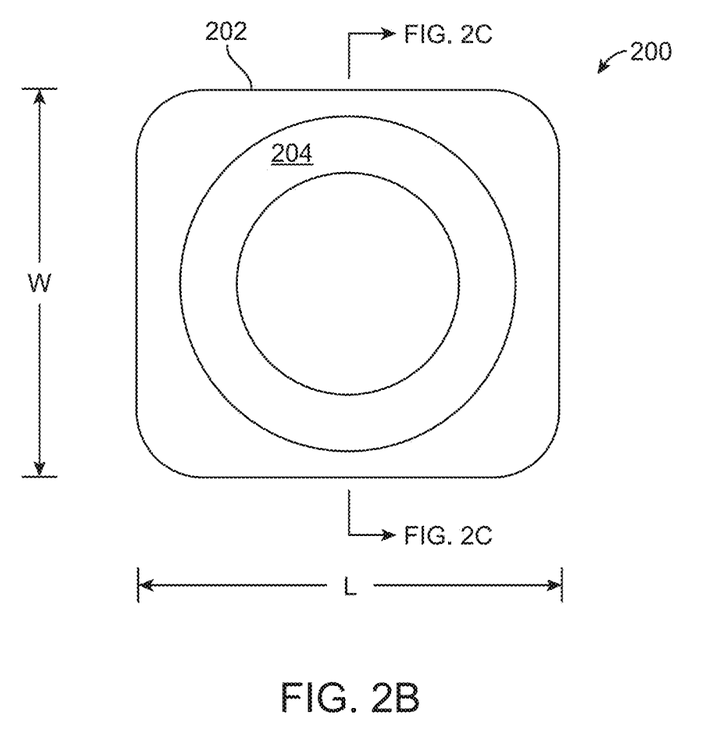
Figure 2C:
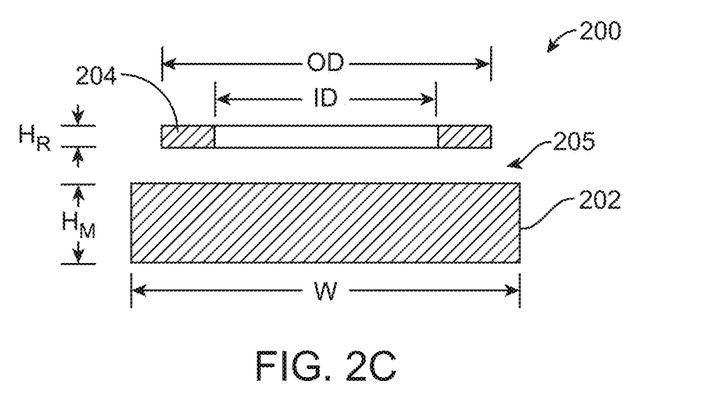

In some embodiments, electronic device 100 can include a magnetic alignment assembly that provides reliable alignment while occupying a small volume within electronic device 100. FIGS. 2A-2C show, respectively, a perspective view, a top view, and a side cross-section view of a magnetic alignment assembly 200 according to some embodiments. For convenience of description, an "axial" direction (also referred to as a "longitudinal" or "z" direction) is defined to be parallel to an axis 201 of magnetic alignment assembly 200, and a transverse plane (also referred to as a "lateral" or "x" or "y" direction) is defined to be normal to axis 201. The term "proximal side" or "proximal surface" is used herein to refer to a side or surface that is oriented toward a charging (or interface) surface, and the term "distal side" or "distal surface" is used to refer to a side or surface opposite the proximal side or surface. The terms "top" and "bottom" may be used in reference to a particular view shown in a drawing but have no other significance. Magnetic alignment assembly 200 includes a main magnet 202 and a ring magnet 204. Main magnet 202 and ring magnet 204 can be separate magnets arranged along a common axis 201, as shown in FIG. 2A. As shown in FIG. 2B, main magnet 202 can be generally square or rectangular when viewed from the top. (All corners and edges can be sharp or rounded as desired.) As shown in FIGS. 2B and 2C, the size of main magnet 202 can be characterized by a width (W), a length (L), and a thickness (HM). Ring magnet 204 can be an annular magnet having an inner diameter (ID), outer diameter (OD), and thickness (HR). Ring magnet 204 can be smaller than main magnet 202. For instance, the outer diameter OD of ring magnet 204 can be less than the width W (or length L) of main magnet 202, and the thickness HR of ring magnet 204 can be less than the thickness HM of main magnet 204. In some embodiments, main magnet 202 can have width W and length L between about 5 mm and about 6 mm and a thickness HM between about 1 mm and about 1.5 mm, while ring magnet 204 can have outer diameter OD between about 4 mm and about 4.5 mm, inner diameter ID between about 3 mm and about 3.5 mm, and thickness HR between about 0.25 and 0.75 mm. In one specific example, main magnet 202 has length and width of about 5.5 mm and thickness of about 1.3 mm, while ring magnet 204 has outer diameter OD of about 4.6 mm, inner diameter ID of about 3.0 mm, and thickness HR of about 0.4 mm. Magnets in this size range can be well-suited to an electronic device with a compact form factor, such as a wrist-worn device. However, embodiments of the invention are not limited to any particular size or size range.

In the example shown, main magnet 202 is square or rectangular when viewed from the proximal side, while ring magnet 204 is rotationally symmetric (or circular). In other embodiments, the magnets can have different shapes. For example, main magnet 202 can be cylindrical or disk-shaped when viewed from the proximal size. Similarly, ring magnet 204 need not be circular; in some embodiments, ring magnet 204 can have a square or rectangular perimeter when viewed from the proximal or distal side, and the opening through the central region can be the same shape as the perimeter (e.g., forming a square or rectangular annulus); in such cases, the "inner diameter" and "outer diameter" can be understood as referring to a measurement along a diagonal. Ring magnet 204 can also have other shapes, such as pentagonal, hexagonal, or the like, and the term "ring" is used herein to indicate the presence of an opening through the central region without restricting to a circular shape. Different shapes of main magnet 202 and ring magnet 204 can be used in any combination (e.g., square main magnet with square or circular ring magnet; circular main magnet with square or circular ring magnet; and so on).

Main magnet 202 and ring magnet 204 can each be made of a magnetic material such as an NdFeB material, other rare earth magnetic materials, or other materials that can be magnetized to create a persistent magnetic field. In some embodiments, the magnets can be plated with a thin layer (e.g., 7-13 µm) of NiCuNi or similar materials. Other coatings, such as epoxy, can be applied in addition to or instead of a plating layer. Each of main magnet 202 and ring magnet 204 can be fabricated as a monolithic structure or using other techniques. Regardless of fabrication technique, main magnet 202 and ring magnet 204 can be separate structures that can be positioned at a desired axial distance from each other, creating a gap 205, as shown in FIG. 2C. In some embodiments, an intervening non-magnetic structure can be placed in gap 205 between main magnet 202 and ring magnet 204; examples are described below.

Figure 3:
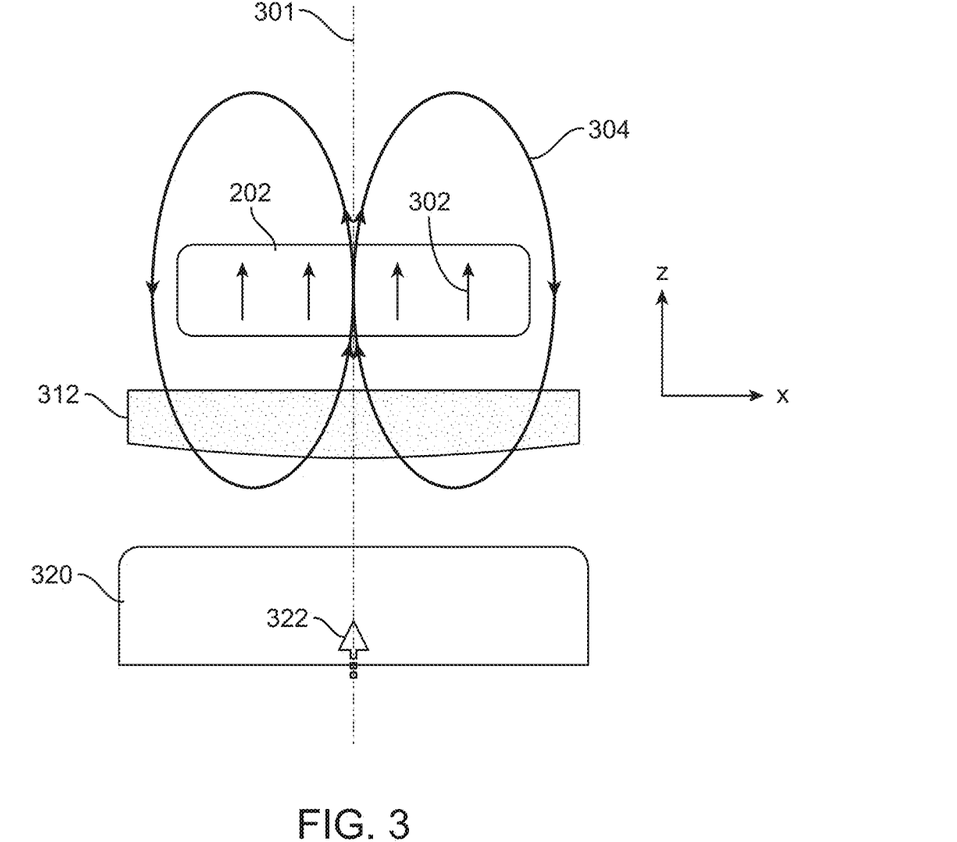
FIG. 3 is a simplified side cross-section view showing a magnetic alignment using only a main magnet according to some embodiments.

Main magnet 202 can be magnetized such that its magnetic dipoles are oriented in the axial (or z) direction. FIG. 3 is a simplified side cross-section view showing a magnetic alignment using only main magnet 202 according to some embodiments. Arrows 302 indicate the magnetic dipole orientation along the z axis. Accordingly, main magnet 202 can generate a magnetic field (represented by flux lines 304) in a dipole pattern. As shown by flux lines 304, the magnetic field of main magnet 202 can extend beyond an interface surface 312, so that main magnet 202 can attract a complementary dipole magnet 320 (which can be, e.g., a cylindrical dipole magnet with magnetic dipole oriented in the axial direction as indicated by arrow 322). Main magnet 202 can attract dipole magnet 320 into a centered alignment, in which the centers of main magnet 202 and dipole magnet 320 are aligned along the same axis 301.

Figure 4:
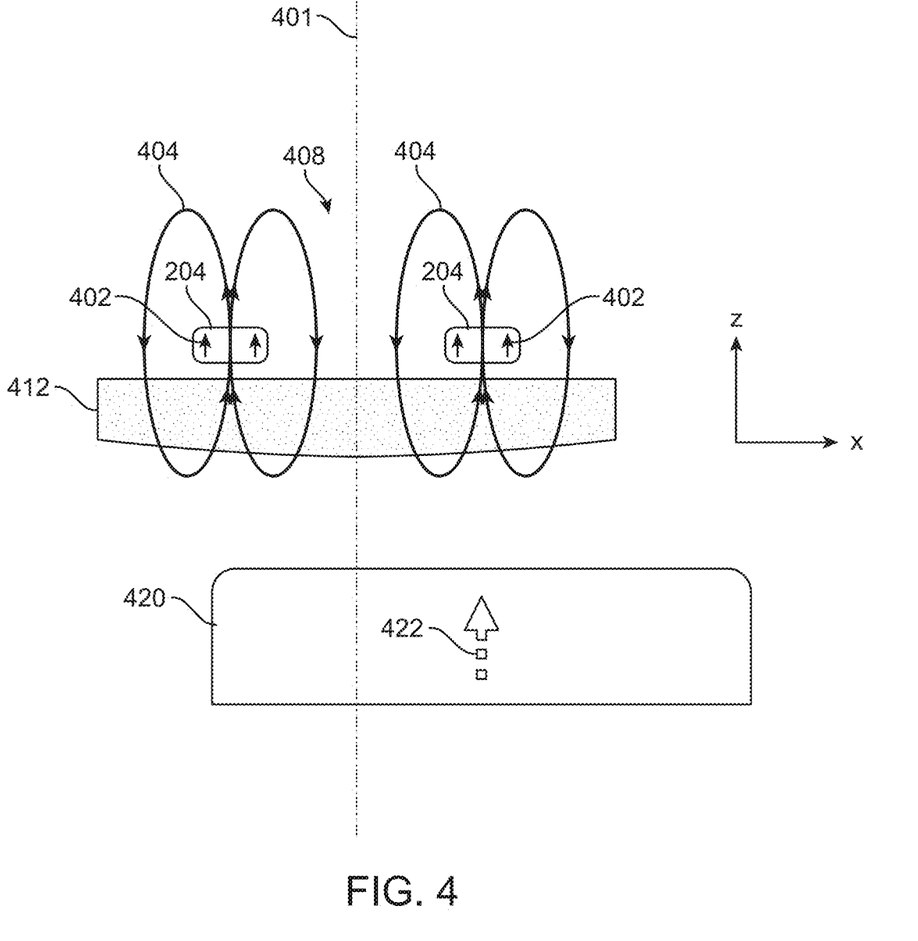
FIG. 4 is a simplified side cross-section view showing a magnetic alignment using only a ring magnet according to some embodiments.

Ring magnet 204 can also be magnetized such that its magnetic dipoles are oriented in the axial (or z) direction. FIG. 4 is a simplified side cross-section view showing a magnetic alignment using only ring magnet 204 according to some embodiments. Arrows 402 indicate the magnetic dipole orientation along the z axis. Accordingly, ring magnet 204 can generate a magnetic field (represented by flux lines 404) in an annular dipole pattern. As shown by flux lines 404, the magnetic field of ring magnet 204 can extend beyond an interface surface 412, so that ring magnet 204 can attract a complementary dipole magnet 420 (which, like magnet 320, can be a cylindrical dipole magnet with magnetic dipole oriented in the axial direction as indicated by arrow 422). In the central region 408 of ring magnet 204, flux lines 404 have the opposite direction from magnetic dipole 422 of dipole magnet 420. Consequently, dipole magnet 420 may be attracted into an off-center alignment in which the center axis 403 of dipole magnet 420 is offset from center axis 401 of ring magnet 204.

Figure 5:
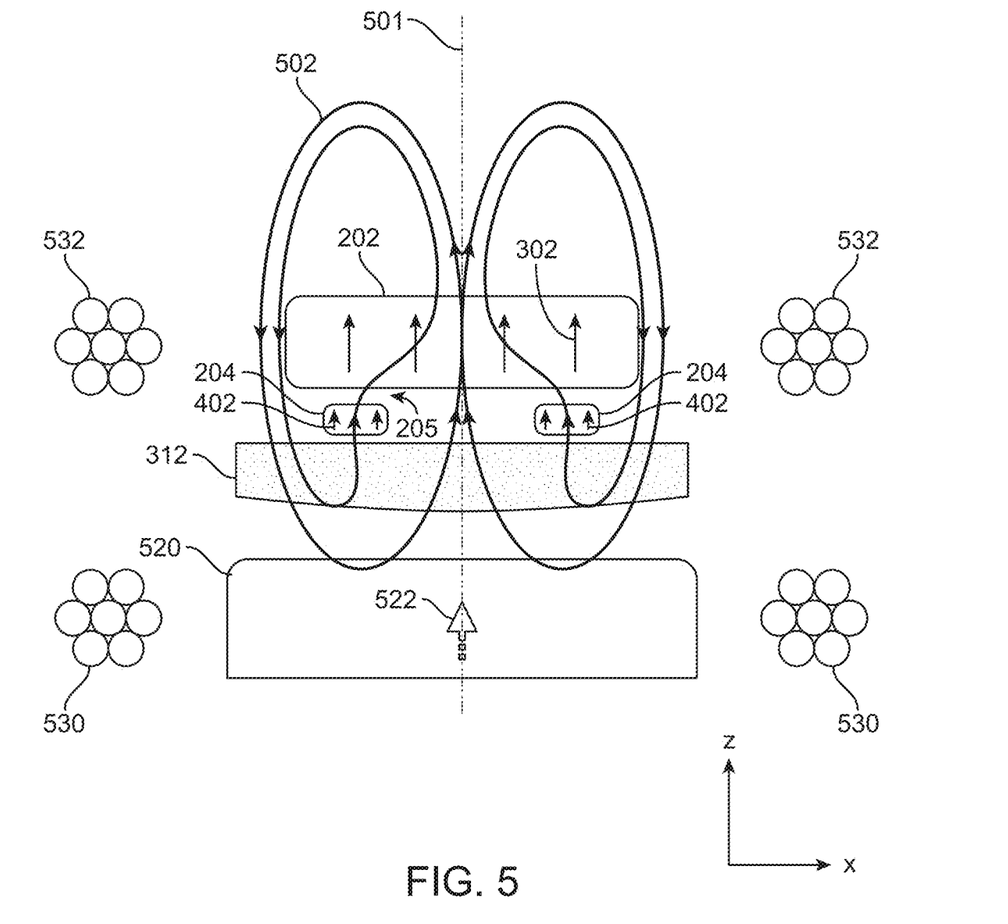
FIG. 5 is a simplified side cross-section view showing a magnetic alignment achieved by a magnetic alignment assembly according to some embodiments.

FIG. 5 is a simplified side cross-section view showing a magnetic alignment achieved by magnetic alignment assembly 200, which combines main magnet 202 and ring magnet 204, according to some embodiments. Arrows 302, 402 indicate the respective magnetic dipole orientations for main magnet 202 and ring magnet 204. As shown, ring magnet 204 can be positioned between main magnet 202 and an interface surface 512. The combination of main magnet 202 and ring magnet 204 can generate a magnetic field as represented by flux lines 502. As shown by flux lines 502, the magnetic field of magnetic alignment assembly 200 has a dipole-like pattern (similar to the magnetic field of main magnet 202 shown in FIG. 3). Accordingly, magnetic alignment assembly 200 can attract a complementary dipole magnet 520 (which can be, e.g., a cylindrical dipole magnet with magnetic dipole oriented in the axial direction as indicated by arrow 522). Magnetic alignment assembly 200 can attract dipole magnet 520 into a centered alignment, in which the centers of magnetic alignment assembly 200 and dipole magnet 520 are aligned along the same axis 501. For a given size and position of main magnet 202 relative to interface surface 512, the attractive force exerted on dipole magnet 520 can be strengthened due to the presence of ring magnet 204 between main magnet 202 and charging surface 512. Alternatively, a magnetic force in the z direction of a given magnitude can be created either by using a thicker main magnet 202 alone or by using or a thinner main magnet 202 in combination with a ring magnet 204. In some embodiments, the use of ring magnet 204 can allow for a reduction in z-height without a reduction in magnetic attachment strength.

FIG. 5 also shows how alignment of magnetic alignment assembly 200 with dipole magnet 520 can act to align inductive charging coils. In some embodiments, a first inductive charging coil 530 can be a coil of wire or other conductive material having dipole magnet 520 fixed at the center, while a second inductive charging coil 532 can be a coil of wire or other conductive material having magnetic alignment assembly 200 fixed at the center. For instance, dipole magnet 520 and first inductive charging coil 530 can be disposed in a charging puck that can supply power (e.g., wireless charger device 150 of FIG. 1), while magnetic alignment 200 and second inductive charging coil 532 can be disposed in an electronic device that can receive power (e.g., electronic device 102 of FIG. 1). Aligning dipole magnet 520 and magnetic alignment assembly 200 can result in aligning inductive coils 530 and 532, thereby enabling efficient inductive power transfer.

It should be understood that the particular magnetic field produced by magnetic alignment assembly 200 depends on the relative sizes of main magnet 202 and ring magnet 204 as well as the size of any gap 205 between them. If ring magnet 204 is large enough (relative to main magnet 202) to dominate the field shaping in the region near dipole magnet 520, the field in that region may have an annular profile (e.g., as shown in FIG. 4), and centered (or coaxial) alignment with another dipole magnet might not be reliably achieved. Accordingly, in some embodiments, ring magnet 204 is smaller than main magnet 202. For example, the outer diameter of ring magnet 204 can be less than the width (or length) of main magnet 202, and the thickness of ring magnet 204 can be less than the thickness of main magnet 202. In some embodiments, the outer diameter OD of ring magnet 204 can be, e.g., 86% of the width W of main magnet 202, and the thickness HR of ring magnet 204 can be less than half the thickness HM of main magnet 202, e.g., 30% of the thickness HM of main magnet 202. The optimal size ratios may also depend on other considerations, such as the size of any gap 205 that may be present between ring magnet 204 and main magnet 202.

It will be appreciated that magnetic alignment assembly 200 is illustrative and that variations and modifications are possible. For example, the main magnet is depicted as being square or rectangular in the transverse plane. In various embodiments, the shape of the main magnet can be varied; for instance, the main magnet can be cylindrical or disc-shaped. The selection of a shape for the main magnet may depend on space constraints and/or the shape of an inductive charging coil. The relative dimensions of the main magnet and ring magnet can be varied as desired, provided that the combination of the main magnet and ring magnet produces a dipole-like magnetic field that can attract another magnetic alignment component having a dipole magnetic field into a centered (or coaxial) alignment.

Figure 6:
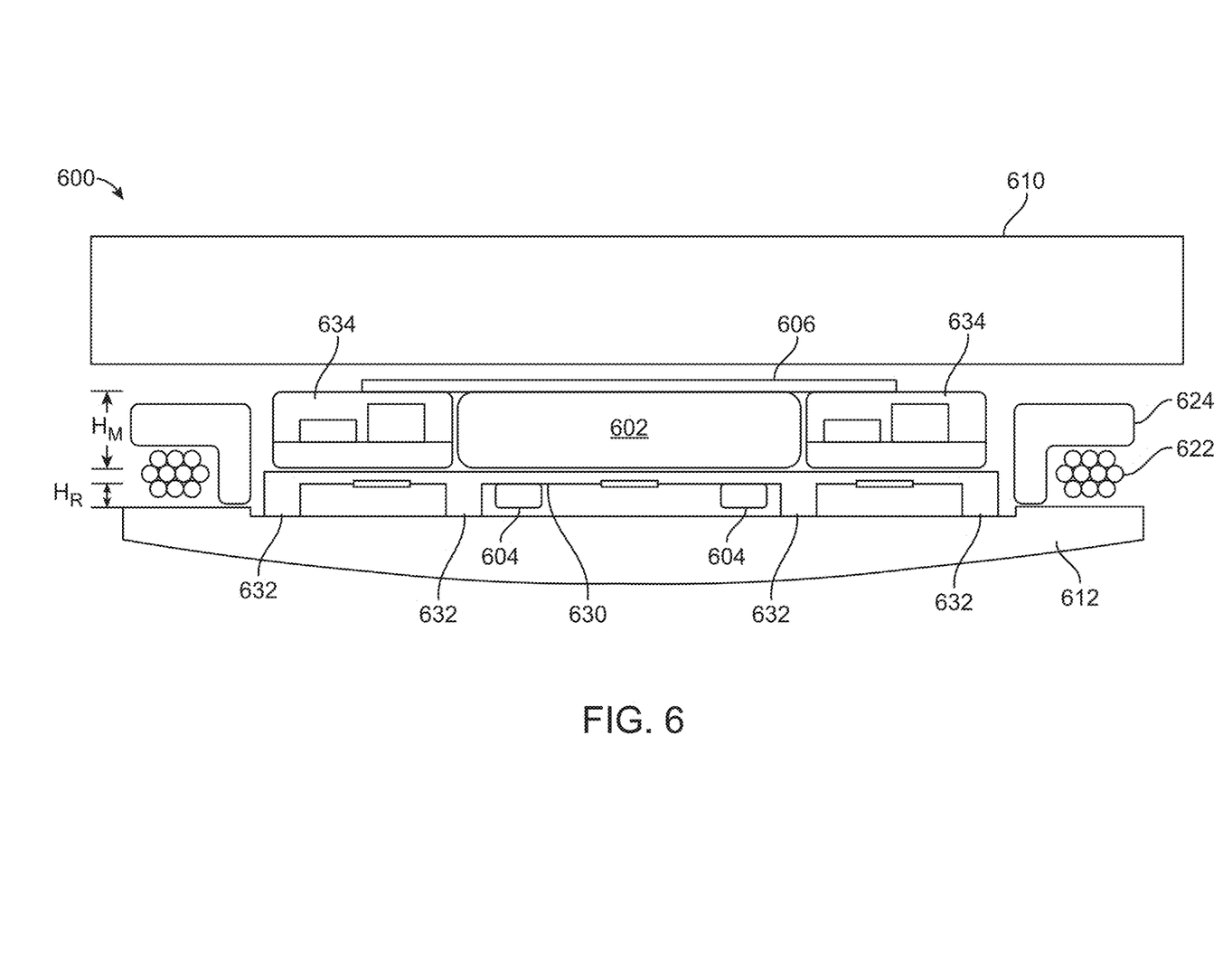
FIG. 6 shows a simplified cross-section view of an electronic device incorporating a magnetic alignment assembly according to some embodiments.

In some embodiments, main magnet 202 and ring magnet 204 can be spaced apart from each other in the axial direction, e.g., with a gap 205 as shown in FIG. 2C. In a compact device such as a wearable electronic device, it may be desirable to position sensors or other components not related to inductive charging in gap 205 between main magnet 202 and ring magnet 204. FIG. 6 shows a simplified cross-section view of an electronic device 600 incorporating a magnetic alignment assembly according to some embodiments. In this example, electronic device 600 is a wrist-worn device, which can be similar to electronic device 102 of FIG.

1. Device 600 can have a main body 610 that can incorporate a touchscreen display, a main system processor, buttons, dials, and/or other components. A back casing 612 can be secured to main body 610 at peripheral regions (not shown) and can define an interface surface for electronic device 600. Back casing 612 can be made of materials such as glass or plastic or other materials that are transparent to AC and DC magnetic fields. Portions or all of back casing 612 can also be optically transparent. a sensor system and inductive charging system can be disposed in the space between back casing 612 and main body 610. For example, the sensor system can include a sensor package 630. Sensor package 630 can incorporate any combination of optical sensors and/or other sensors. In some embodiments, sensor package 630 can include opaque projections 632 to block stray light from propagating from one sensor to another. Sensor package 630 can be electrically coupled to a sensor logic board 634, which can include control circuitry to operate the sensors. For purposes of understanding the present disclosure, it suffices to understand that sensor package 630 and sensor logic board 634 are examples of components that may occupy space between main body 610 and back casing 612, and a detailed description of particular sensors or control logic is omitted.

The inductive charging system can include an inductive coil 622, which can be made of turns of copper wire or other conductive material. An electromagnetic shield 624, which can be made of ferrite or other appropriate material, can be provided to prevent electromagnetic interference between inductive coil 622 and sensor logic board 634 as well as other electronic components that may be present in main body 610. The inductive charging system can also include a magnetic alignment assembly having a main magnet 602 and a ring magnet 604. Main magnet 602 can be generally similar to main magnet 202 described above. Main magnet 602 can be disposed on the distal side of sensor package 630, with sensor logic board 634 disposed adjacent to main magnet 602 on one or more sides. In some embodiments, sensor logic board 634 can surround main magnet 602 on all sides. The thickness of main magnet 602 can be chosen to match the thickness of sensor logic board 634. Ring magnet 604 can be generally similar to ring magnet 204 described above. Ring magnet 604 can be positioned between the proximal surface of sensor package 630 and back casing 612. In this example, ring magnet 604 is spaced apart from main magnet 602 in the axial direction, with sensor package 630 occupying the space between main magnet 602 and ring magnet 604. A DC magnetic shield 606 can be positioned on the distal side of main magnet 602 to prevent interference with electronic components in main body 610.

Figure 7:
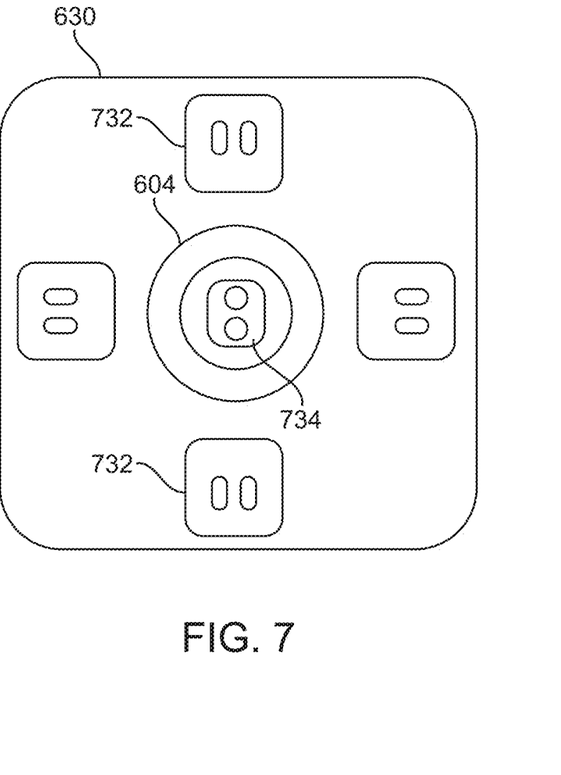
FIG. 7 shows a view of the proximal surface of a sensor package with a ring magnet disposed thereon according to some embodiments.

FIG. 7 shows a view of the proximal surface of sensor package 630 with ring magnet 604 disposed thereon according to some embodiments. As can be seen, one or more sensor subsystems 732 can be located outboard of ring magnet 604 (i.e., outside the outer diameter of ring magnet 604). Additionally or instead, one or more sensor subsystems 734 can be located inboard of ring magnet 604 (i.e., inside the inner diameter of ring magnet 604). In either case, the inner diameter and outer diameter of ring magnet 604 can be chosen to avoid obscuring sensor subsystem(s) 732 and/or sensor subsystem(s) 734. In some embodiments, sensor subsystem(s) 732 and/or sensor subsystem(s) 734 can include optical sensors. Ring magnet 604 can be coated with antireflective coatings or other coatings with desired optical properties to avoid affecting the optical sensors. The annular shape of ring magnet 604 can accommodate an array of sensors, including centrally-disposed sensor subsystem(s) 734.

Figure 8:
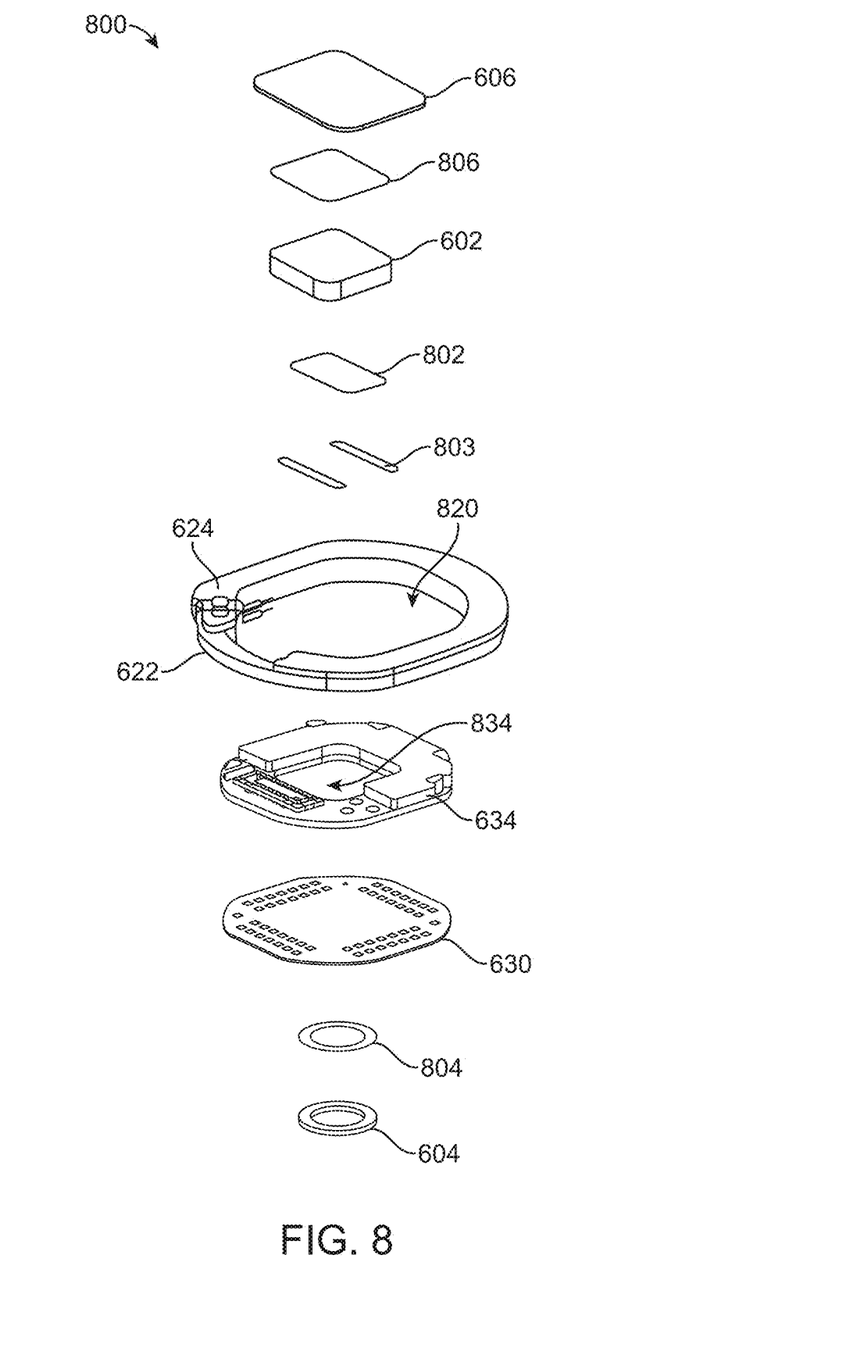
FIG. 8 shows a simplified exploded view of a backside assembly for an electronic device according to some embodiments.

FIG. 8 shows a simplified exploded view of a backside assembly 800 for an electronic device (e.g., electronic device 600 of FIG. 6) according to some embodiments. Backside assembly 800 incorporates many of the components shown in FIG. 6. For example, DC shield 606 can be attached to main magnet 602 using an adhesive (e.g., pressure-sensitive adhesive, or "PSA") 806. Inductive coil 622 and electromagnetic shield 624 can have a central opening 820 that accommodates sensor logic board 634 and main magnet 602. Similarly, sensor logic board 634 can have a central opening 834 that accommodates main magnet 602. Main magnet 602 can be attached to the distal surface of sensor package 630 using glue 802 and/or PSA 803. Ring magnet 604 can be attached to the proximal surface of sensor package 630 using PSA 804, which can be sized and shaped to match ring magnet 604 so that PSA 804 also does not obscure any sensors of sensor package 630.

It will be appreciated that backside assembly 800 is illustrative, and variations and modifications are possible. A magnetic alignment assembly having a main magnet and a ring magnet can be incorporated into a variety of electronic devices. Sensor package 630 is illustrative of electronic or other components that may be disposed between a main magnet and a ring magnet. In various embodiments, any component or components can be disposed between a main magnet and a ring magnet of a magnetic alignment assembly, provided that the component thus disposed is compatible with the magnetic fields of the magnetic alignment assembly.

While the invention has been described with reference to specific embodiments, those skilled in the art will appreciate that variations and modifications are possible. For instance, the inductive charging and magnetic alignment assemblies described herein are designed to be compact so that the receiver coil and alignment magnets can fit into a portable electronic device with a small form factor such as a wrist-worn device. However, magnetic alignment assemblies of the kind described herein can be incorporated into any portable electronic device regardless of form factor or particular supported functionality.

All numerical values and ranges provided herein are illustrative and may be modified. Unless otherwise indicated, drawings should be understood as schematic and not to scale. All materials mentioned herein are also illustrative and may be modified. For example, different types of magnetic materials and adhesives can be used.

Further, while it is contemplated that magnetic alignment assemblies of the kind described herein can be used to facilitate alignment between transmitter and receiver coils for wireless power transfer between devices, use of such magnetic alignment assemblies is not so limited, and magnetic alignment assemblies can be used in a variety of contexts to hold one device in relative alignment with another, regardless of whether either or both devices have wireless charging coils.

Accordingly, although the invention has been described with respect to specific embodiments, it will be appreciated that the invention is intended to cover all modifications and equivalents within the scope of the following claims.

What is claimed is:

1. A magnetic alignment assembly comprising:
   a main magnet formed as a solid body having a magnetic dipole orientation defining an axial direction, the main magnet having a thickness in the axial direction and a width in a lateral plane transverse to the axial direction; and a ring magnet disposed coaxially with the main magnet, the ring magnet having a magnetic dipole orientation in the same axial direction as the magnetic dipole orientation of the main magnet, the ring magnet having an outer diameter less than the width of the main magnet such that the main magnet extends beyond the outer diameter of the ring magnet in all directions in the lateral plane, and a thickness less than the thickness of the main magnet, wherein the ring magnet is oriented toward an interface surface.

2. The magnetic alignment assembly of claim 1 wherein the main magnet has a square or rectangular shape in the lateral plane and the ring magnet has a circular shape in the lateral plane.

3. The magnetic alignment assembly of claim 2 wherein the outer diameter of the ring magnet is between 80% and 90% of the width of the main magnet.

4. The magnetic alignment assembly of claim 1 wherein the thickness of the ring magnet is about 30% of the thickness of the main magnet.

5. The magnetic alignment assembly of claim 1 wherein the main magnet and the ring magnet are spaced apart in the axial direction.

6. The magnetic alignment assembly of claim 5 wherein an electronic component is disposed in the axial space between the main magnet and the ring magnet.

7. The magnetic alignment assembly of claim 1 wherein a combined magnetic field of the main magnet and the ring magnet has a shape that attracts a dipole magnet into a coaxial alignment with the ring magnet.

* * * * *